United States Patent [19]

Sellers

[11] Patent Number: 6,054,979

[45] Date of Patent: Apr. 25, 2000

[54] CURRENT SENSING TOUCHPAD FOR COMPUTERS AND THE LIKE

[75] Inventor: Charles A. Sellers, Houston, Tex.

[73] Assignee: Compaq Computer Corporation, Houston, Tex.

[21] Appl. No.: 08/697,195

[22] Filed: Aug. 21, 1996

[51] Int. Cl.[7] .................................................. G09G 5/00
[52] U.S. Cl. ........................................................ 345/173
[58] Field of Search ................................... 345/173, 174, 345/177, 179

[56] References Cited

U.S. PATENT DOCUMENTS

| | | | |
|---|---|---|---|
| 4,529,959 | 7/1985 | Ito et al. .................................... | 178/18 |
| 4,570,149 | 2/1986 | Thornburg et al. ........................ | 178/18 |
| 4,680,429 | 7/1987 | Murdock et al. ......................... | 345/173 |
| 4,736,191 | 4/1988 | Matzke et al. ............................ | 345/157 |
| 4,798,919 | 1/1989 | Miessler et al. ........................... | 178/18 |
| 4,862,151 | 8/1989 | Grauz et al. .............................. | 345/173 |
| 5,157,717 | 10/1992 | Hitchcock ................................. | 379/96 |
| 5,313,051 | 5/1994 | Brigida et al. ............................ | 345/173 |
| 5,451,724 | 9/1995 | Nakazawa et al. ....................... | 345/173 |
| 5,469,194 | 11/1995 | Clark et al. ............................... | 345/173 |
| 5,473,143 | 12/1995 | Vak et al. ................................. | 235/380 |
| 5,495,077 | 2/1996 | Miller et al. .............................. | 345/173 |
| 5,543,589 | 8/1996 | Buchana et al. ......................... | 345/173 |
| 5,790,106 | 11/1995 | Hirano et al. ............................ | 345/173 |

OTHER PUBLICATIONS

MicroTouch Product Catalog (1996 Edition).
*ClearTek Capacitive Touchscreen Kits*, MicroTouch Brochure.
*Experience the Power of Touch*, MicroTouch Brochure.
*TouchTek Resistive Touchscreens*, MicroTouch Brochure.
*TouchPen Solutions*, MicroTouch Brochure.
*MicroTouch Touch Technologies Backgrounder*, MicroTouch Systems, Inc. (May 1996).
*Capacitive–Digitizer*, MicroTouch Brochure.
*Interactive Kiosk Enclosures*, Factura Brochure.
*Interactive Kiosk Enclosures II*, Factura Brochure.
*Infrared Detector Products*, Servo Brochure (Aug. 2, 1996) (pp. 1–3).
*Servo Model 1501 Pyroelectric Detectors*, Servo Brochure (Aug. 2, 1996) (pp. 1–2).
Travis, Bill, *Smart Sensors*, EDN (May 9, 1996) (pp. 57–60, 62, 65–65).
*Touch Products: Product and Price Information*, Carroll Touch Brochure (Mar. 1996).
*Guided Wave Touch Sensors for Flat Panels*, Carroll Touch Brochure.
*Carroll Touch Software Drivers*, Carroll Touch Brocure (Dec. 15, 1995).

(List continued on next page.)

*Primary Examiner*—Amare Mengistu
*Attorney, Agent, or Firm*—Akin, Gump, Strauss, Hauer & Feld, LLP

[57] ABSTRACT

A touch sensitive pad is formed of a touchpad surface overlaid with a matrix of two overlaid arrays of conductors spaced from each other by an intermediate dielectric. The conductors and dielectric are deposited as successive layers in the surface, which is formed of a suitable substrate material. The conductors in each of the arrays are in the form of spaced rows extending in alignment, and the two conductor arrays are arranged so that their respective sets of rows intersect, forming an X-Y matrix over the face of the touchpad. The two arrays are provided with different voltage levels so that a potential difference exists between them. A user touching an area or portion of the touchpad, whether with a finger, stylus, or pointer, shorts contacted ones of the X-Y matrix of conductors together in the area touched, giving rise to an electric current flow. The precise location of the contact area can be determined by processing firmware or software. The resultant current flow is used to activate the processing electronics, which can otherwise be left in a power-conserving or sleep mode if the touchpad is not in use.

25 Claims, 4 Drawing Sheets

OTHER PUBLICATIONS

*Modular Controllers*, Carroll Touch Brochure.
*Modular Infrared Touch Frames for Flat Panels*, Carroll Touch Brochure (Dec. 21, 1995).
*Unitouch*, Carroll Touch Brochure (Nov. 6, 1995).
*Modular Infrared Touch Frames for CRTs*, Carroll Touch Brochures (Nov. 2, 1995).
*Infrared Smat–Frames® for CRTs*, Carroll Touch Brochure (Feb. 16, 1996).
*Touch in a Box,* Carroll Touch Brochure (Nov. 2, 1995).
*In touch with excellence*, ELO TouchSystems, Inc. Brochure (1994).
*Touch Power . . . Experience It!,* PixelTouch Brochure.
PixelTouch Product Lines Brochure.
*Touch Monitors*, PixelTouch Brochure.
Product listing of SVGA Monitors.
*10.4" Touchscreen LCD*, PixelTouch Brochure.
*10.4" Active Matrix TFT Color Monitors*, Products Brochure for PixelTouch.
*TouchScreen Technology Comparison.*
*Touch–TV™ TTV–20R*, PixelTouch Brochure.
*Touch–Pad™*, PixelTouch Brochure.
*Custom Kiosks*, PixelTouch Brochure.
*CD–i 9" Touch Kiosk*, PixelTouch Brochure.
*Photo–Zip*, PixelTouch Brochure.
*Product Update*, Electronic Products (Aug. 1996) (p. 49–50).
Product Catalog, Touch Technology (1994).
*Falcon II*, Brochure of Signs of Intelligence.

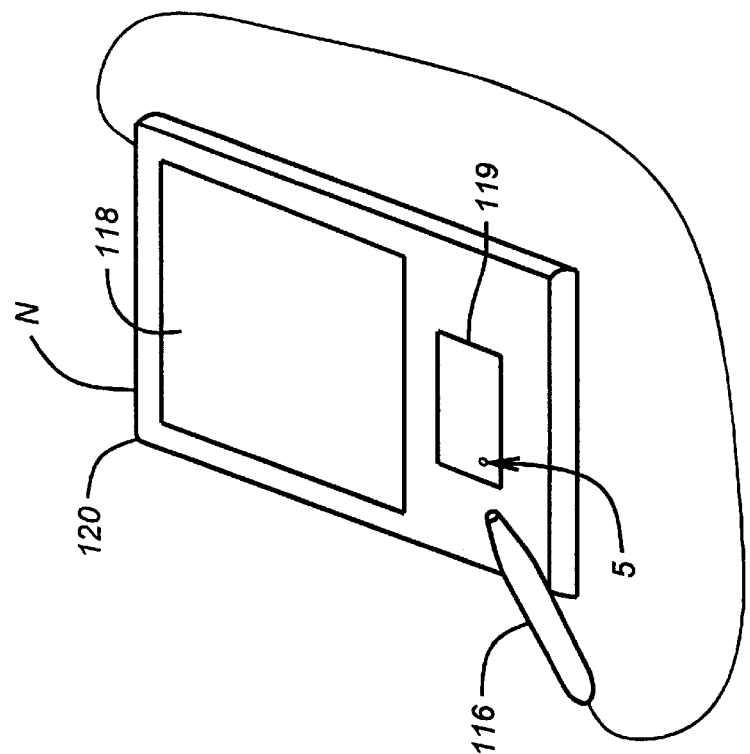
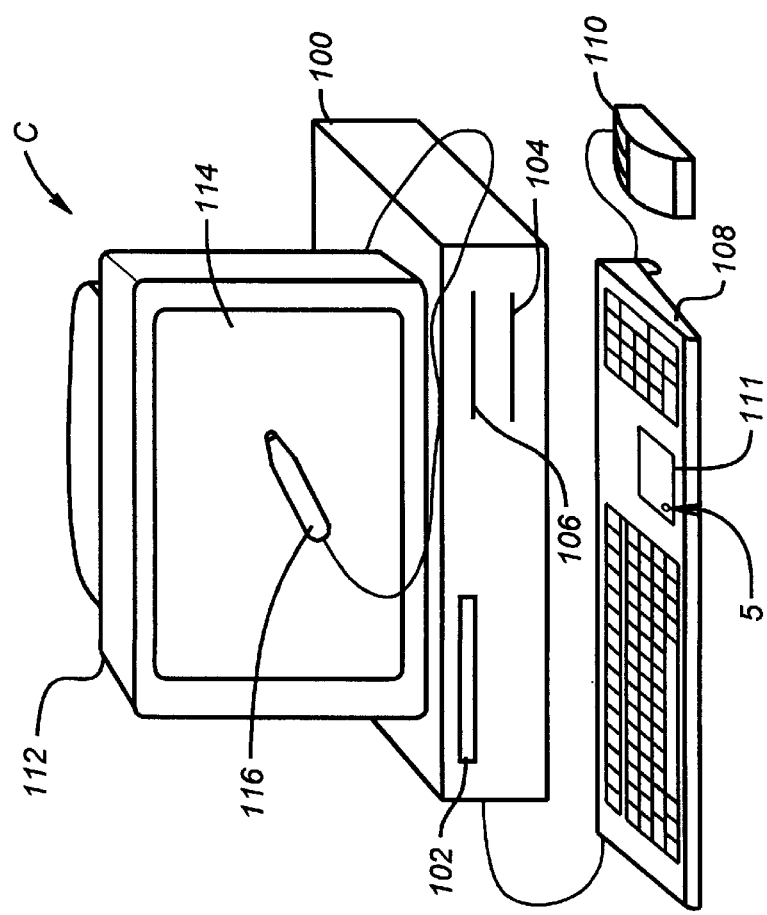

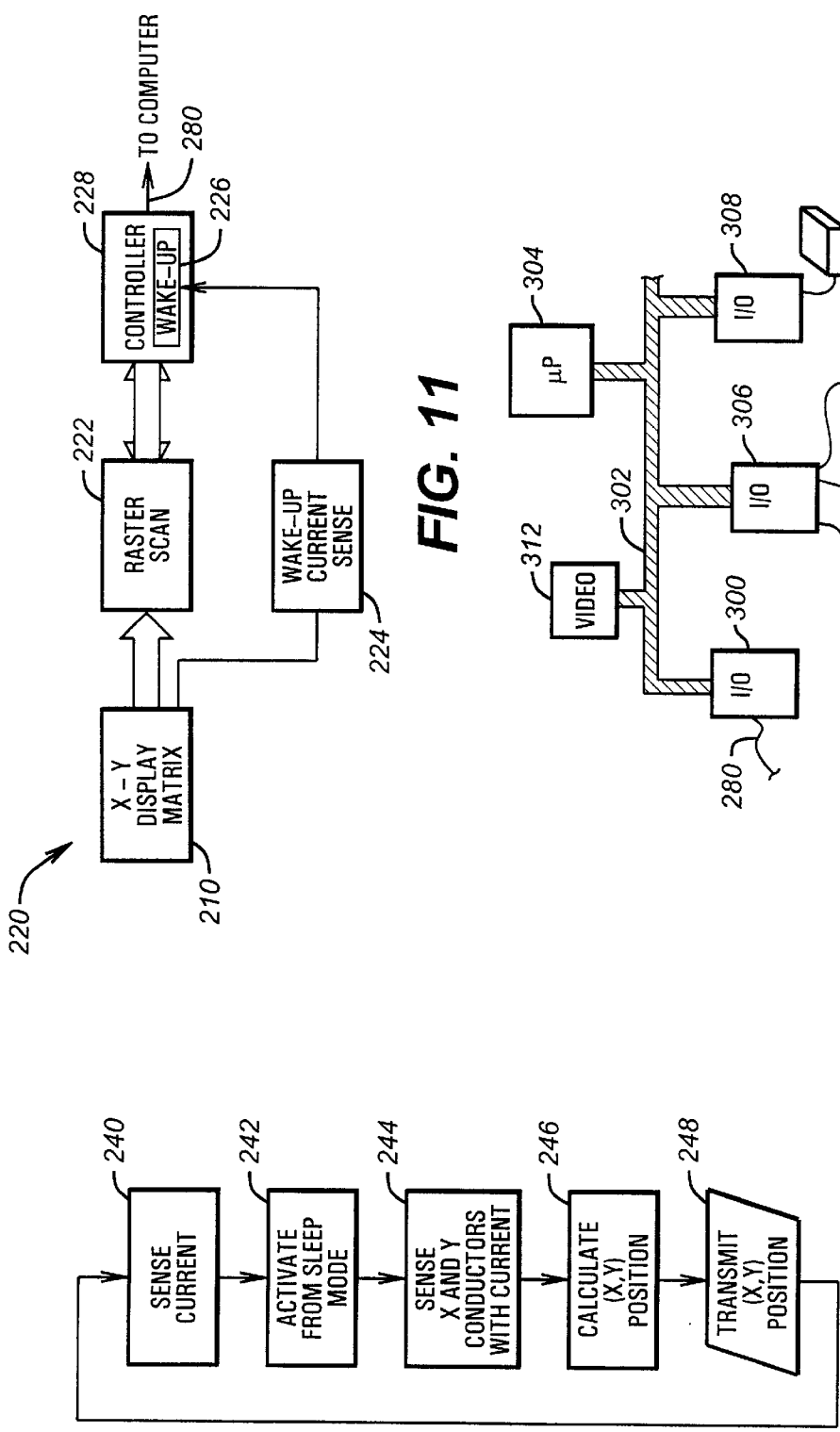

CURRENT SENSING TOUCHPAD FOR COMPUTERS AND THE LIKE

BACKGROUND OF THE INVENTION

1. Field of the Invention

The present invention relates to computer systems and to user input devices for them.

2. Description of the Related Art

The explosion of the personal computer market has lead to great advances and ease of use of those personal computers. The keyboard and text display has given way to a variety of user input devices for control of graphical interfaces. These input devices either augment or totally replace the keyboard, and include mice, track balls, digitizer pads, touch sensitive screens, among other things.

So far as is known, there have been three principal technologies used for digitizer pads and touch sensitive screens. These are known as capacitive technology, resistive technology, and surface acoustic wave (SAW) technology.

Resistive technology typically used a voltage gradient on a plastic on glass membrane overlay to sense touch. For example, a five wire sense system created a voltage gradient on the bottom layer, and the top layer senses that voltage. The two layers of the screens were coated with a thin, clear conductive metal oxide on their facing sides and held apart by a layer of materials composed of spacer dots. Along the edges of the sensor was electrode pattern. The controller dispersed a uniform voltage field across the sensor and then measured the voltage on the glass layer at the location where a user's finger or other indicator object pressed the two layers together. The sensed voltage was then translated into a set of digital touch coordinates by a controller and sent to a host computer.

Capacitive digitizer technology typically used an all glass sensor with a transparent, thin film conductive coating fused to its surface. Along the edges was a narrow, precisely printed electrode pattern that uniformly distributed low voltage, AC field over the conduct layer. When a finger made contact with the screen surface, it "capacitively coupled" with the voltage field, drawing a minute amount of current to the point of contact. The current flow from each corner was proportional to the distance to the finger and the ratios of these flows were measured by the controller and used to locate the touch.

Surface acoustic wave (SAW) technology provided a glass panel with transducers that transmitted and received surface waves over the face of the screen. When a finger or other object touched the screen, a portion of the energy of the wave was absorbed at the touch location. This location could then be determined based on the presence of interference patterns caused in the acoustic wave.

SUMMARY OF THE INVENTION

Briefly, the present invention provides a new and improved touchpad which receives input information from a user according to a location touched. The touchpad includes a touchpad surface which has two arrays of electrical conductors arranged in an X-Y matrix of rows across the touchpad surface. An insulative or dielectric material is located between the arrays of electrical conductors in the matrix to prevent electrical contact between them where the rows of the matrix intersect.

The arrays of electrical conductors are furnished with different operating voltages from each other, and the conductors in the arrays respond to contact by forming electrical connections between them and giving rise to electrical current flow. Contact either by a user's finger or by a probe or stylus is adequate to form such an electrical connection. Processing electronics detects the flow of electrical current. The processing electronics may include a wake-up mechanism which responds to detection of electrical current for power conservation purposes.

Each of the arrays of electrical conductors is preferably formed of a plurality of aligned rows of electrically conductive strips, separated from the other array by the dielectric material. The conductors of the arrays and the dielectric materials are preferably applied as separate layers on the touchpad surface, in a manner similar to the formation of integrated circuit layers.

BRIEF DESCRIPTION OF THE DRAWINGS

A better understanding of the present invention can be obtained when the following detailed description of the preferred embodiment is considered in conjunction with the following drawings, in which:

FIG. 1 is an isometric drawing of a computer system with touchpad according to the present invention;

FIG. 2 is an isometric drawing of a notepad computer system with touchpad according to the present invention;

FIG. 10 is a flowchart illustrating the operation of processing electronics of the system of the present invention;

FIG. 11 is a schematic electrical diagram of processing electronics of the system of the present invention; and FIG. 12 is a schematic diagram of the computer system of FIG. 1.

DETAILED DESCRIPTION OF THE PREFERRED EMBODIMENT

Figure 4:
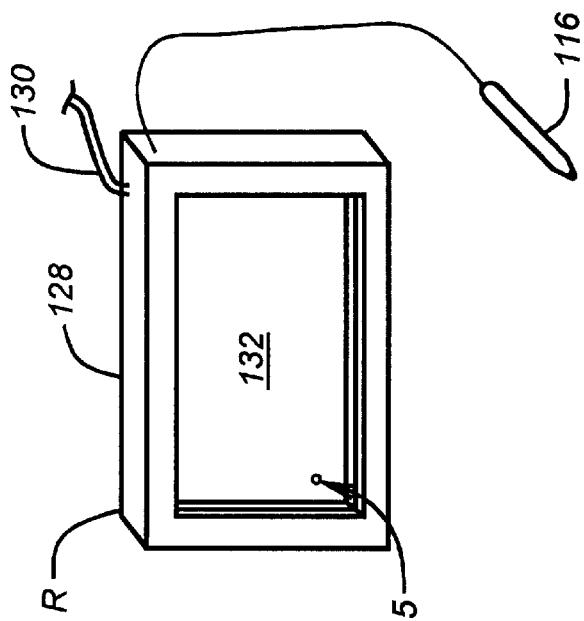
FIG. 4 is an isometric drawing of a touchpad overlay device according to the present invention.

Turning to FIG. 1, a computer system C is shown according to the present invention including a mother board (not shown) within a chassis 100, with the mother board having a microprocessor providing input/output (I/O) with a CD ROM drive 102, a floppy disk drive 104, and a hard disk drive 106. Further, the microprocessor and other appropriate mother board devices are coupled to a keyboard 108 and to a mouse 110. The keyboard 108 also includes a touchpad 111 according to the present invention. The devices on the mother board also communicate with a video display 112. As will be set forth, the touchpad 111 responds to contact by a user with a finger or with a suitable stylus or probe 116. Further details of the computer system are set forth below. It should also be understood that the present invention may also be practiced with other forms of computers than that shown in FIG. 1.

For example, turning to FIG. 2, a notepad computer N with a digitizing screen 118 is shown implemented according to the invention. In this case, a touchpad 119 is also provided below digitizing screen 118. The screen responds to input indications provided by the user via stylus 116, while touchpad 119 is provided to respond both to a user's contact exercised by finger or body contact or in conjunction with the stylus 116. A chassis 120 houses the necessary processors, input/output circuitry, and other circuitry necessary for operation of the notebook computer N.

Figure 3:
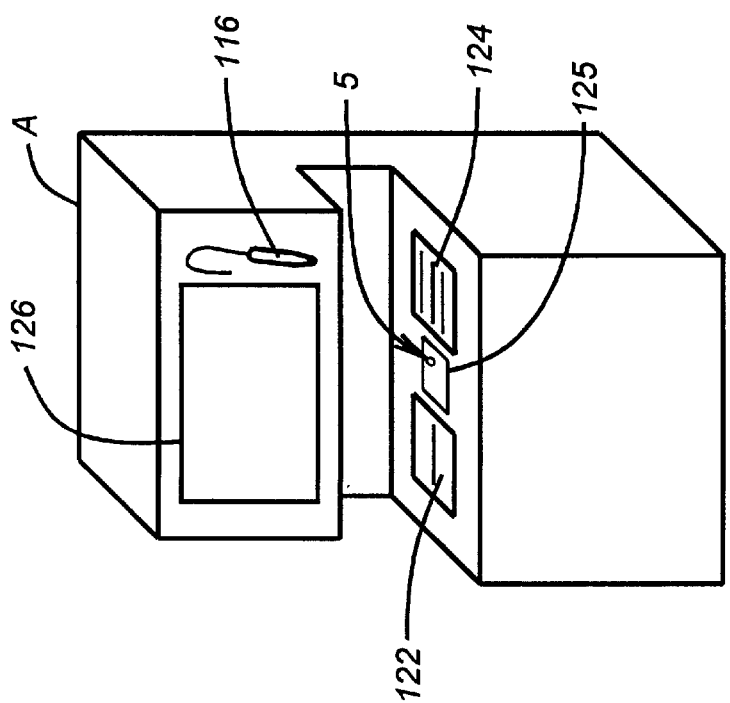
FIG. 3 is an isometric drawing of an automated teller system with touchpad according to the present invention.

Turning to FIG. 3, shown is a remote data entry terminal, such as an automated teller system A, which can also exhibit touchpad capability according to the invention. The automated teller system A can include a dispenser 122 for money, tickets, and other materials typically provided by automated tellers, and includes an input 124 for, for example, credit cards. The system A includes a touchpad 125 suitably located and implemented according to the present invention, again responding to either a user's body or finger contact or with the stylus 116. The automated teller system also includes a conventional display 126.

As shown in FIG. 4, an overlay device O is provided with a touchpad 132 for use as a data input terminal for a computer, such as a computer system like that of FIG. 1. The overlay device O includes, for example, a touchpad 132, a frame 128, an I/O cable 130, and responds to either user finger contact or to contact by the stylus 116.

Figure 5:
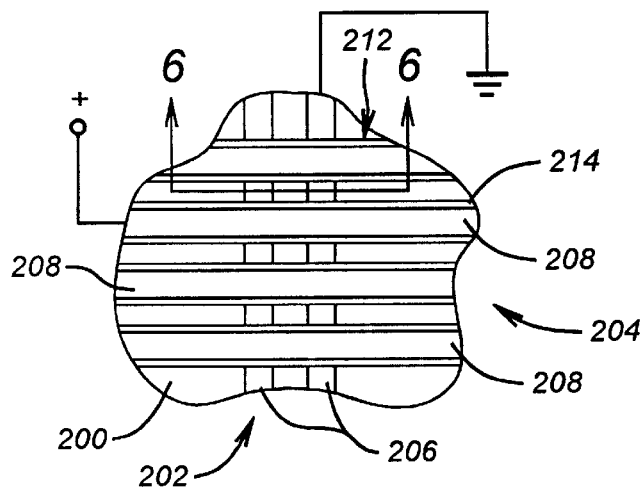
FIG. 5 is an enlarged diagram of a portion of any one of the structures of FIGS. 1 through 4, inclusive, circled and bearing reference numeral 5 designating same.
Figure 9:
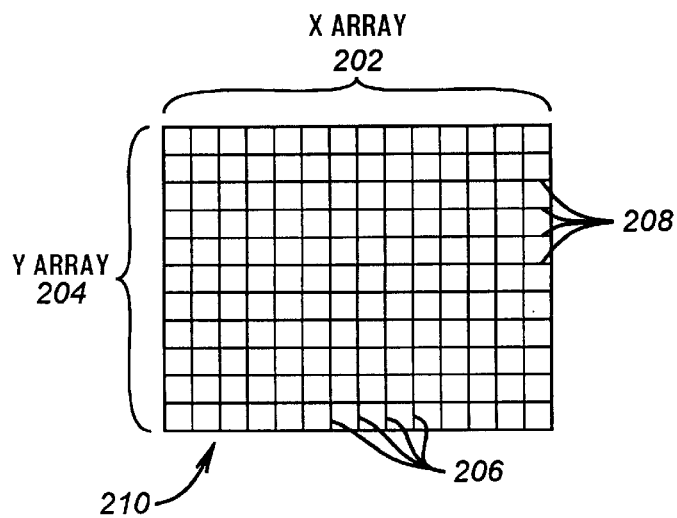
FIG. 9 is a schematic diagram of a touchpad according to the present invention.

In each of the touchpads 111, 119, 125 and 132, a relatively small portion thereof has been circled and indicated by the reference numeral 5, which has been somewhat enlarged and shown in FIG. 5 of the drawings. FIG. 9 represents schematically a touchpad constructed according to the structure of FIG. 5. The subject matter of FIG. 5 is highly enlarged from that of FIG. 9. The touchpad having the structure of FIGS. 5 and 9 according to the present invention may be provided as any of the touchpads 111, 119, 125 and 132 shown in the drawings.

Referring to FIG. 5, a touchpad according to the present invention has a touchpad surface 200, on which is formed or deposited a matrix of two overlaid conductor arrays 202 and 204, respectively. Each of the arrays 202 and 204 is in the form of a plurality of rows of electrical conductors, shown as 206 in the array 202 and as conductors 208 in the array 204. Each of the conductors 206 and 208 in the respective arrays 202 and 204 are in the form of electrically conductive strips which are formed on the touchpad surface 200 by being deposited thereon using conventional integrated circuit conductor deposition technology. The touchpad surface 200 serves in effect as a substrate material and is preferably of some suitable glass or synthetic resin material.

The conductors 206 and 208 in each of the arrays are spaced laterally from each other and extend in alignment across the touchpad surface 200. The electrical conductors 208 in the second array 204 of rows thus extend in alignment with each other across the touchpad surface 200 in a direction transverse to, and generally perpendicular to, and intersecting the rows of conductors 206 in the first array 202.

Figure 6:
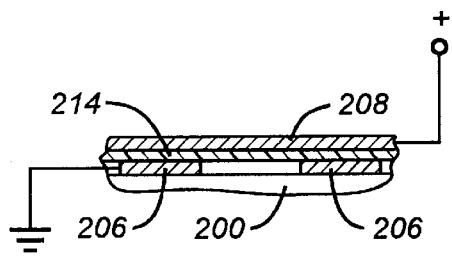
FIG. 6 is a cross-sectional view taken along the lines 6—6 of FIG. 5.

The arrays 202 and 204 of conductors are arranged so that their respective sets of rows intersect with each other, forming an X-Y matrix 210 (FIG. 9) over the face of the touchpad. The two arrays 202 and 204 are provided with different operating voltage levels, typically by connecting one of the arrays to electrical ground and furnishing a conventional pull-up operating bias, as indicated in FIGS. 5 and 6, of a suitable level to the other so that a potential difference exists between the two arrays.

An insulative layer 212 of a suitable dielectric material is interposed between the conductor arrays 202 and 204. In the preferred embodiment, the dielectric array 212 is in the form of a number of laterally extending strips 214 of dielectric material which are in general alignment with the second array 204 of conductors, each strip of dielectric material being interposed beneath and underlying an individual one of the conductors 208 in the second array 204. The dielectric strips 212 insulate a superposed conductor 208 from each of the intersecting, transversely extending conductors 206 in the first array 202 across the surface 200.

According to the present invention, a user desiring to enter data or request instructions from a computer system according to the present invention touches a particular area of the touchpad surface 200. As has been set forth, this contact may be made by contact with a finger or other body portion of the user, or with a stylus or a pointer such as that shown at 116. When contact is made by a user, the contacting element, whether the user's finger or the stylus or pointer, forms an electrically conductive path (FIGS. 7 and 8) between the otherwise insulated conductors 206 and 208 in the area of contact. The conductive path forms an electrical short circuit and gives rise to an electrical current flow in the X-Y matrix of conductors in the area being contacted.

A processing electronics circuit 220 (FIG. 11) is provided to detect the flow of electrical current in the conductors which are connected by contact from the user. The processing circuitry 220 includes a raster scan circuit 222 connected to each of the conductors in the X-Y display matrix 210. The raster scan circuit 222 when active performs a rasterized scan of each of the possible contact points in the X-Y matrix 210 in the conventional manner. The X-Y matrix circuit is also connected to a wake-up current sensor circuit 224. When contact by a user causes current to flow in the matrix 210, the current sensor circuit 224 sends a signal to a wake-up mechanism or activation circuit 226 of a controller 228.

The controller 228 when activated by its wake-up circuit 226 causes the raster scan circuit 222 to perform a sequential scan of the possible contact points in the X-Y matrix 210 where current flow may be present. At each X-Y matrix location where current flow is sensed, raster scan circuit 222 forms an indication which is provided to controller 228. The controller 228 forms an output signal which furnished to the computer system with which touchpad 200 is used. The output signal as formed is a periodic indication of the X-Y geometric center point of the portion of touchpad surface 200 contacted by a user. The point on touchpad surface 200 so identified is furnished as the output signal to the computer, as set forth above.

The processing electronics circuitry 220 thus responds to the flow of electrical current in the X-Y matrix of conductors in the touchpad, causing the processing electronics 220 to activate from a sleep or inactive standby mode. In this manner, the processing electronics 220, other than the current detector systems 224 and 226 provided therein, need not be consuming electrical power when processing is not needed in response to contact from a user. In this way, electrical power may be conserved according to the present invention. The current detectors 224 and 226 in the processing electronics 220 thus functions as a wake-up mechanism in response to detection of current flow as a result of contact by a user with the touchpad.

After contact by a user has activated the processing electronics 220, the processing electronics 220 with which the touchpad surface 200 is associated performs a processing sequence depicted in FIG. 10 of the drawings to sense which of the conductors in the X-Y matrix have 210 current flow therein. A first step 240 of the processing sequence is the sensing of current in the matrix 210 by current sensor 224. When this occurs, the wake-up mechanism 226 activates controller 228, as indicated in step 242. Controller 226 then causes raster scan circuit 222 to sense which of the conductors in the X-Y matrix 210 are carrying current, as shown in step 244. These indications are provided to controller 228, which calculates the X-Y geometric center point during step 246. Thereafter, as indicated in step 248, the location so detected is transmitted to the computer system. Based on this detection of conductors in which electrical current is flowing, the contacted X-Y area or position in the X-Y matrix is thus determined utilizing conventional processing techniques. The determination is transmitted to other portions of the computer system. The computer system then responds to such a signal in the same manner as an area indication from a computer mouse. Processing by the computer system may continue according to the particular operations required of the computer involved.

For example, as shown in FIG. 12, a block diagram illustrates typical components of the computer system of FIG. 1 for using the data from the controller 228 of FIG. 11. Preferably the data from the microcontroller 228 is received over a communications link 280 by an I/O device 300, such as a high speed serial I/O device or a parallel I/O device. This data is then sent over a bus 302 for processing by a microprocessor 304, such as a Pentium® type microprocessor by Intel Corporation. The microprocessor 304 also preferably responds to an I/O device 306, which controls, for example, the keyboard 108, the mouse 110 and the floppy drive 106. The microprocessor 304 also preferably responds to an I/O device 308, which controls the hard disk drive 104. Based on the input from the mouse 110 and the keyboard 108, as well as the operating software preferably found on the hard disk 104, the microprocessor 304 uses the digital data from the data link 280 to control the display 112 through a video controller 312. In this way, data from the touchpad matrix 210 is used within the graphical user interface.

As has been set forth, the conductors 206 and 208 in the X-Y matrix are deposited by conventional printed circuit conductive strip deposition techniques. These strips are in effect a matrix of conductive lines or strips whose width and respective spacing may be varied according to the particular type of contact anticipated. For example, where contact is to be made with a user's finger, the spacing need not be as close as where contact is normally made by a probe or stylus such as in situations of signature recognition or the like.

Figure 7:
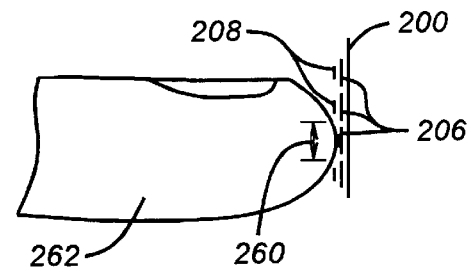
FIGS. 7 and 8 are side-elevation views of the structure of FIG. 5.
Figure 8:
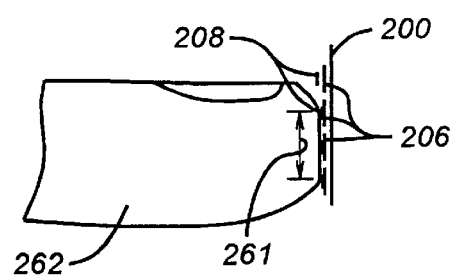

When contact is made by a user's finger, as is indicated in FIG. 7, a surface area 260 of the user's finger forms an electrical connection between the conductors in the X-Y matrix as has been set forth. Further, if the application pressure increases, an expanded area of skin contact 261 is present at the user's fingertip 262, as is shown in FIG. 8, bridging and electrically connecting together an increased number of intersecting conductors in the X-Y matrix. Similar results occur during stylus contact with appropriate conductor spacing in the X-Y matrix.

If desired, the processing electronics may be programmed to form a time sequence or record of the relative number of conductors brought into contact with each other over a succession of time intervals. When the area of contact with a user's finger or with a probe is increasing as a function of time, indicating that the amount of pressure is being increased, the current sensing touchpad according to the present invention provides a third dimension, or a Z-axis, contact measure. In these situations, the increasing area of surface contact is indicated by the increasing number of electrical conductors which are bearing current as a result of such contact. This change which occurs over a period of time provides an indication of the relative amount of inward movement desired to be indicated by the user's increasing pressure on the touchpad.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A touch sensitive computer input system for receiving input information from a user according to a location touched, comprising:

a touchpad surface;

a first array of rows of electrical conductors spaced from each other and extending in alignment across said touchpad surface;

a second array of rows of electrical conductors spaced from each other and extending in alignment across said touchpad surface in a direction intersecting said rows of said first array;

an insulative material isolating said electrical conductors of said first and second arrays from each other where said rows of arrays intersect;

said rows of arrays defining an X-Y matrix across said touchpad surface;

a voltage supply to bias said arrays to different voltages from each other;

said isolated electrical conductors of the arrays being electrically connectable by a contacting element which carries an electrical current between them; and processing electronics for determining the flow of electrical current in connected conductors.

2. The input system of claim 1, wherein said processing electronics are in a normal sleep mode in the absence of user contact, and wherein said processing electronics include a wake-up mechanism responsive to detection of current flow in said connected electrical conductors.

3. The input system of claim 1, wherein said touchpad surface comprises a computer data input terminal.

4. The input system of claim 3 further including a microprocessor for computing data received from said data input terminal.

5. The input system of claim 4, wherein said processing electronics comprise said microprocessor.

6. The input system of claim 1, wherein said touchpad surface comprises a remote data entry terminal.

7. The input system of claim 6, wherein said remote data entry terminal comprises an automated teller machine.

8. The input system of claim 1, wherein said touchpad surface comprises an overlay device.

9. The input system of claim 1, wherein said first array, said insulative material, and said second array are formed on said touchpad surface by being deposited thereon.

10. The input system of claim 1, wherein said first array, said insulative material, and said second array are formed on said touchpad surface by being deposited successively thereon.

11. The input system of claim 1, wherein said conductors of said first array comprise a plurality of electrically conductive strips formed on said touchpad surface.

12. The input system of claim 11, wherein said conductors of said second array comprise a plurality of electrically conductive strips formed on said touchpad surface.

13. The input system of claim 12, wherein said insulative material comprises a plurality of strips of dielectric material, each aligned with one of said electrically conductive strips of said second array.

14. The input system of claim 13, wherein said strips of dielectric material are narrower than said conductive strips of said second array.

15. The input system of claim 12, wherein said insulative material comprises a plurality of strips of dielectric material, each aligned with and underlying one of said electrically conductive strips of said second array.

16. A computer system comprising:
   a microprocessor for data computation and processing;
   a display for forming images of said data; and
   a touch sensitive input system for entry of data, comprising:
      a touchpad surface;
      a first array of rows of electrical conductors spaced from each other and extending in alignment across said touchpad surface;
      a second array of rows of electrical conductors spaced from each other and extending in alignment across said touchpad surface in a direction intersecting said rows of said first array;
      an insulative material isolating said electrical conductors of said first and second arrays from each other where said rows of arrays intersect;
      said rows of arrays defining an X-Y matrix across said touchpad surface;
      a voltage supply to bias said arrays to different voltages from each other;
      said isolated electrical conductors of the arrays being electrically connectable by a contacting element which carries an electrical current between them; and
      processing electronics for determining the flow of electrical current in connected conductors.

17. The computer system of claim 16, wherein said processing electronics are in a normal sleep mode in the absence of user contact, and wherein said processing electronics include a wake-up mechanism responsive to detection of current flow in said connected electrical conductors.

18. The computer system of claim 16, wherein said touchpad surface comprises a remote data entry terminal.

19. The computer system of claim 18, wherein said remote data entry terminal comprises an automated teller machine.

20. The computer system of claim 16, wherein said touchpad surface comprises an overlay device.

21. The computer system of claim 16, wherein said first array, said insulative material, and said second array are formed on said touchpad surface by being deposited thereon.

22. The computer system of claim 16, wherein said first array, said insulative material, and said second array are formed on said touchpad surface by being deposited successively thereon.

23. The computer system of claim 16, wherein said conductors of said first array comprise a plurality of electrically conductive strips formed on said touchpad surface.

24. The computer system of claim 23, wherein said conductors of said second array comprise a plurality of electrically conductive strips formed on said touchpad surface.

25. The computer system of claim 24, wherein said insulative material comprises a plurality of strips of dielectric material, each aligned with one of said electrically conductive strips of said second array.

* * * * *